(12) United States Patent
Iwasaki

(10) Patent No.: US 11,368,602 B2
(45) Date of Patent: Jun. 21, 2022

(54) INFORMATION PROCESSING DEVICE AND NON-TRANSITORY COMPUTER READABLE MEDIUM STORING PROGRAM TO EXECUTE PROCESS FOR PROCESSING INFORMATION

(71) Applicant: FUJIFILM Business Innovation Corp., Tokyo (JP)

(72) Inventor: Manabu Iwasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 188 days.

(21) Appl. No.: 16/525,516

(22) Filed: Jul. 29, 2019

(65) Prior Publication Data

US 2020/0053250 A1    Feb. 13, 2020

(30) Foreign Application Priority Data

Aug. 10, 2018    (JP) .............................. JP2018-152095

(51) Int. Cl.
| | | |
|---|---|---|
| *H04N 1/60* | (2006.01) | |
| *H04N 1/44* | (2006.01) | |
| *H04N 1/32* | (2006.01) | |

(52) U.S. Cl.
CPC ......... *H04N 1/444* (2013.01); *H04N 1/32128* (2013.01); *H04N 1/4473* (2013.01)

(58) Field of Classification Search
None
See application file for complete search history.

(56) References Cited

U.S. PATENT DOCUMENTS

| | | | |
|---|---|---|---|
| 8,307,002 B2 * | 11/2012 | Ooba | H04N 1/00838 |
| | | | 707/784 |
| 2009/0199280 A1 * | 8/2009 | Muto | G06F 21/31 |
| | | | 726/6 |
| 2011/0188073 A1 * | 8/2011 | Akutsu | G06F 15/00 |
| | | | 358/1.15 |
| 2017/0034365 A1 * | 2/2017 | Uruma | H04N 1/0097 |

FOREIGN PATENT DOCUMENTS

| | | |
|---|---|---|
| JP | 2006270353 | 10/2006 |
| JP | 2008-052644 | 3/2008 |

OTHER PUBLICATIONS

"Office Action of Japan Counterpart Application" with English translation thereof, dated Apr. 26, 2022, p. 1-p. 3.

* cited by examiner

*Primary Examiner* — Dung D Tran
(74) *Attorney, Agent, or Firm* — JCIPRNET

(57) ABSTRACT

An information processing device includes a reception unit that receives an instruction to delete a preregistered user, a storage unit that stores related information that relates to a process that the user executes on the information processing device itself, and a deletion unit that deletes the related information stored in the storage unit corresponding to a user targeted for deletion received by the reception unit.

10 Claims, 10 Drawing Sheets

FIG. 9

|  |  | COUNTING MODE | | |
|---|---|---|---|---|
|  |  | NONE | MAIN UNIT | EXTERNAL UNIT |
| AUTHENTICATION MODE | NONE |  | ▓ |  |
|  | MAIN UNIT | ▓ | ▓ | ▓ |
|  | EXTERNAL UNIT |  | ▓ |  |

INFORMATION PROCESSING DEVICE AND NON-TRANSITORY COMPUTER READABLE MEDIUM STORING PROGRAM TO EXECUTE PROCESS FOR PROCESSING INFORMATION

CROSS-REFERENCE TO RELATED APPLICATIONS

This application is based on and claims priority under 35 USC 119 from Japanese Patent Application No. 2018-152095 filed Aug. 10, 2018.

BACKGROUND

(i) Technical Field

The present disclosure relates to an information processing device and a non-transitory computer readable medium.

(ii) Related Art

Japanese Unexamined Patent Application Publication No. 2008-052644 proposes a storing unit including multiple storage areas that stores image data and information related to the image data in the storage areas in association with each other, and an image forming device that forms an image according to stored image data. The image forming device is provided with a user information input unit, a user authentication unit, an acquisition unit that acquires access rights information of image data, a determination unit that determines whether access rights information actually exists, a deletion unit that deletes image data in the case in which the determination unit determines that the access rights information does not exist, and an access control unit that controls access to the image data on the basis of authenticated user information and the acquired access rights information.

SUMMARY

In the case in which registered user information is deleted, or in the case in which the method of identifying a registered user is changed, such as in the case in which the authentication method is changed, there is a possibility that related information that relates to the user may remain, and security may no longer be guaranteed. Accordingly, aspects of non-limiting embodiments of the present disclosure relate to an information processing device and a non-transitory computer readable medium capable of guaranteeing security in the case in which the method of identifying a registered user is changed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a reception unit that receives an instruction to delete a pre-registered user, a storage unit that stores related information that relates to a process that the user executes on the information processing device itself, and a deletion unit that deletes the related information stored in the storage unit corresponding to a user targeted for deletion received by the reception unit.

BRIEF DESCRIPTION OF THE DRAWINGS

An exemplary embodiment of the present disclosure will be described in detail based on the following figures, wherein:

FIG. 9 is a diagram for explaining another condition on deleting related information that relates to a user.

DETAILED DESCRIPTION

Figure 1:
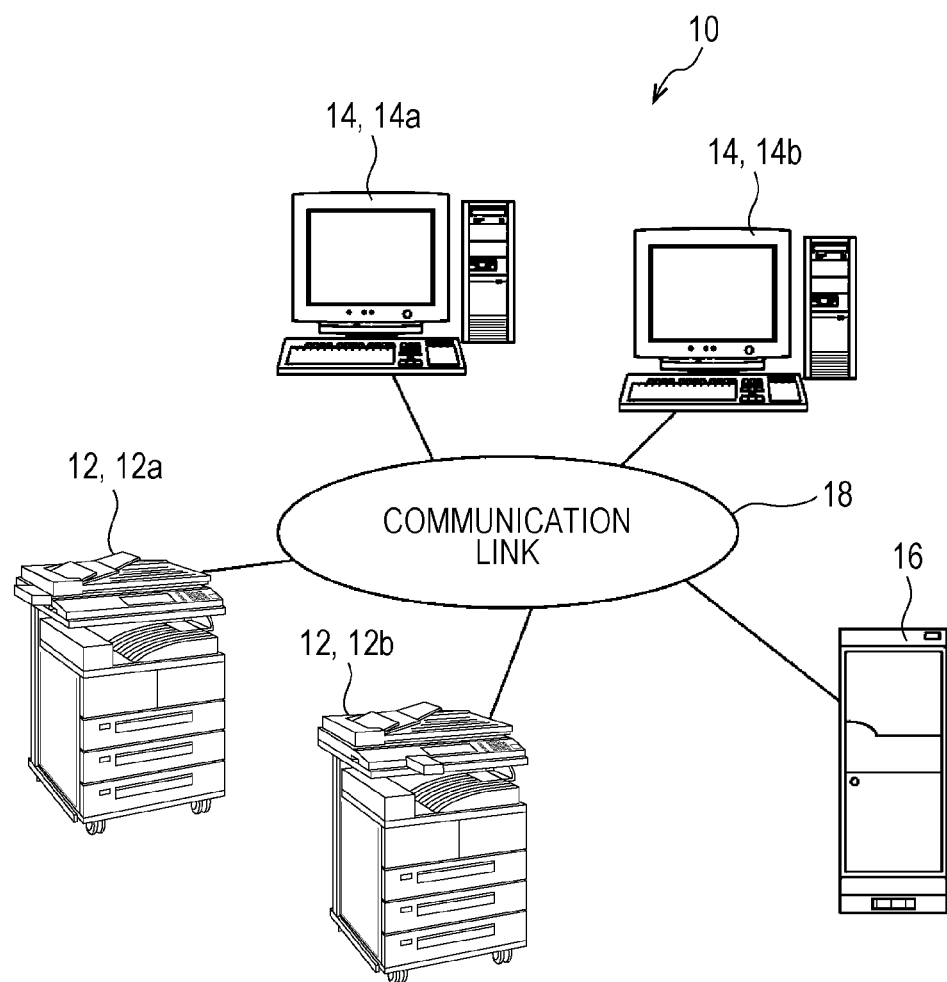
FIG. 1 is a diagram illustrating a schematic configuration of an information processing system according to the exemplary embodiment.

Hereinafter, one example of the exemplary embodiment will be described in detail and with reference to the drawings. In the exemplary embodiment, an information processing system in which multiple image forming devices, multiple information processing devices, and a server are connected to each other over a communication link such as a network will be described as an example. FIG. 1 is a diagram illustrating a schematic configuration of an information processing system 10 according to the exemplary embodiment.

As illustrated in FIG. 1, the information processing system 10 according to the exemplary embodiment is provided with multiple image forming devices 12a, 12b, and so on, multiple information processing devices 14a, 14b, and so son, and a server 16. Note that, when it is not necessary to distinguish the image forming devices 12a, 12b, and so on or the information processing devices 14a, 14b, and so on individually, the letter at the end of the reference sign will be omitted in some cases. Also, in the exemplary embodiment, an example provided with multiple image forming devices 12a, 12b, and so on and multiple information processing devices 14a, 14b, and so on is described, but at least one of the image forming devices 12 and the information processing devices 14 may also be a single device. Additionally, a cloud server may also be applied as the server 16. Additionally, in the exemplary embodiment, the image forming devices 12 correspond to an image processing device, and the server 16 corresponds to an information processing device.

The image forming devices 12, the information processing devices 14, and the server 16 are connected to each other through a communication link 18 such as a local area network (LAN), a wide area network (WAN), the Internet, or an intranet. Additionally, the image forming devices 12, the information processing devices 14, and the server 16 are able to transmit and receive various data with each other through the communication link 18.

Figure 2:
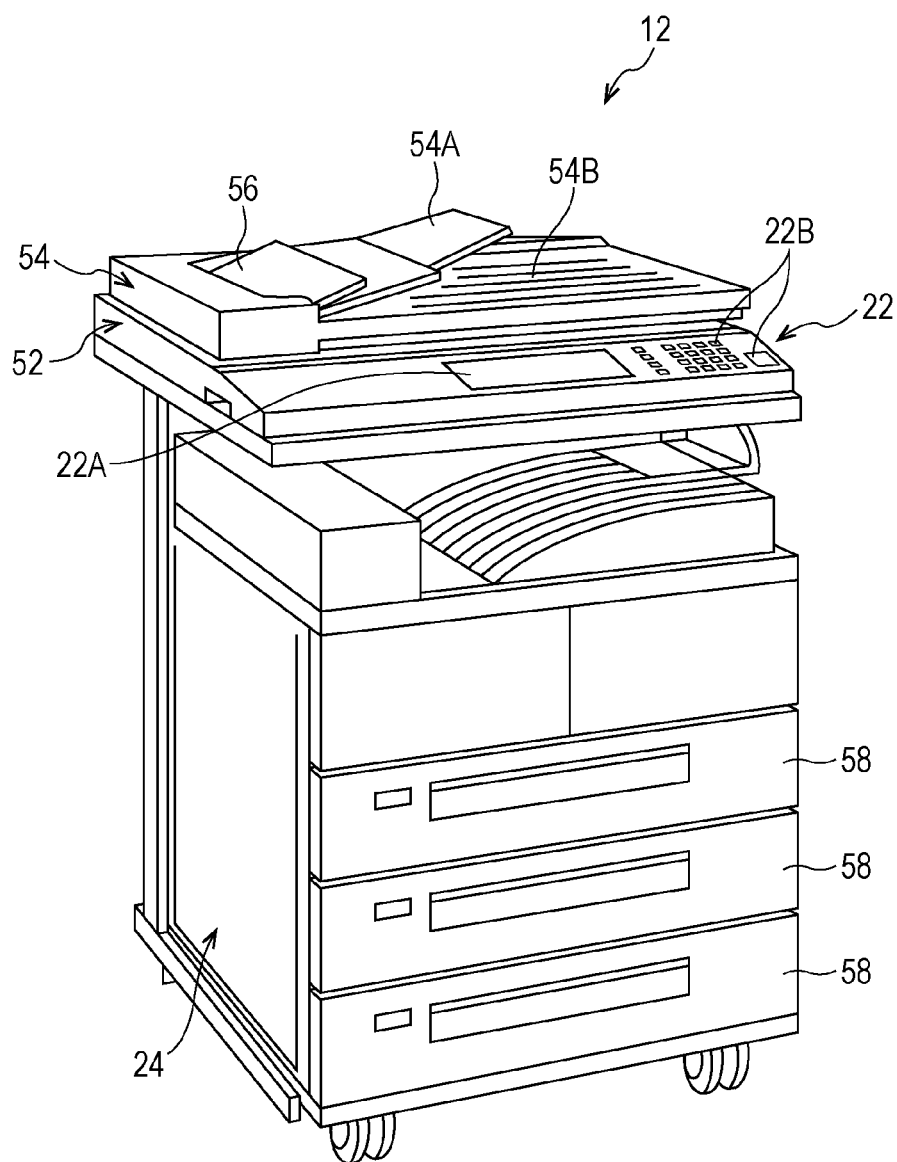
FIG. 2 is a perspective view illustrating the external appearance of an image forming device according to the exemplary embodiment.

FIG. 2 is a perspective view illustrating the external appearance of an image forming device 12 according to the exemplary embodiment. The image forming device 12 according to the exemplary embodiment includes a print function that receives various data through the communication link 18, and executes an image forming process based on the received data. In addition, the image forming device 12 according to the exemplary embodiment also includes a read function that reads a document to obtain image information expressing the document, a copy function that copies an image recorded on a document to a sheet of paper, a facsimile function that transmits and receives various data through a telephone line not illustrated, and the like.

In addition, the image forming device 12 according to the exemplary embodiment is provided with a document reading unit 52 on the top part of the device, and an image forming unit 24 is disposed below the document reading unit 52. The document reading unit 52 is provided with a document transport unit (omitted from illustration) inside a document cover 54. The document transport unit successively takes in a document 56 placed in a document feed unit 54A provided in the document cover 54, transports each sheet onto a platen glass not illustrated, and reads the image recorded on the document 56. Also, the document transport unit delivers the document 56 whose image has been read into a document delivery tray 54B provided on the document cover 54.

Also, the document reading unit 52 is provided with a user interface 22 that receives various instruction operations from a user. The user interface 22 is provided with a touch panel display 22A on which display buttons that achieve the receiving of instruction operations and various information are displayed by a software program, hardware keys 22B such as a keypad and a start button, and the like. In the user interface 22, the display buttons on the display 22A and the hardware keys 22B are used to set the number of copies and scale factor when using the copy function, and are also used as telephone dialing keys or the like when using the facsimile function.

On the other hand, the image forming unit 24 is provided with a paper feed storage unit 58 housing paper sheets that act as the recording medium used for image formation. In the image forming unit 24, the paper sheets housed in the paper feed storage unit 58 are retrieved one at a time, and an image based on image data is formed onto each paper sheet by an electrophotography process, for example. Also, in the image forming unit 24, the paper sheets on which an image has been formed are successively delivered into a delivery tray not illustrated.

By transmitting an image formation request, the information processing device 14 causes an image to be formed on a paper sheet by the print function of the image forming device 12.

The server 16 includes a management function that manages information related to inexpediences in various modules (parts) installed in the image forming devices 12 connected to the communication link 18. Additionally, the server 16 may also include a function of transmitting an image formation request from an information processing device 14 to the image forming device 12 that is the target of the request, a function of monitoring the conditions in an image forming device 12 and notifying an information processing device 14, and the like.

Figure 3:
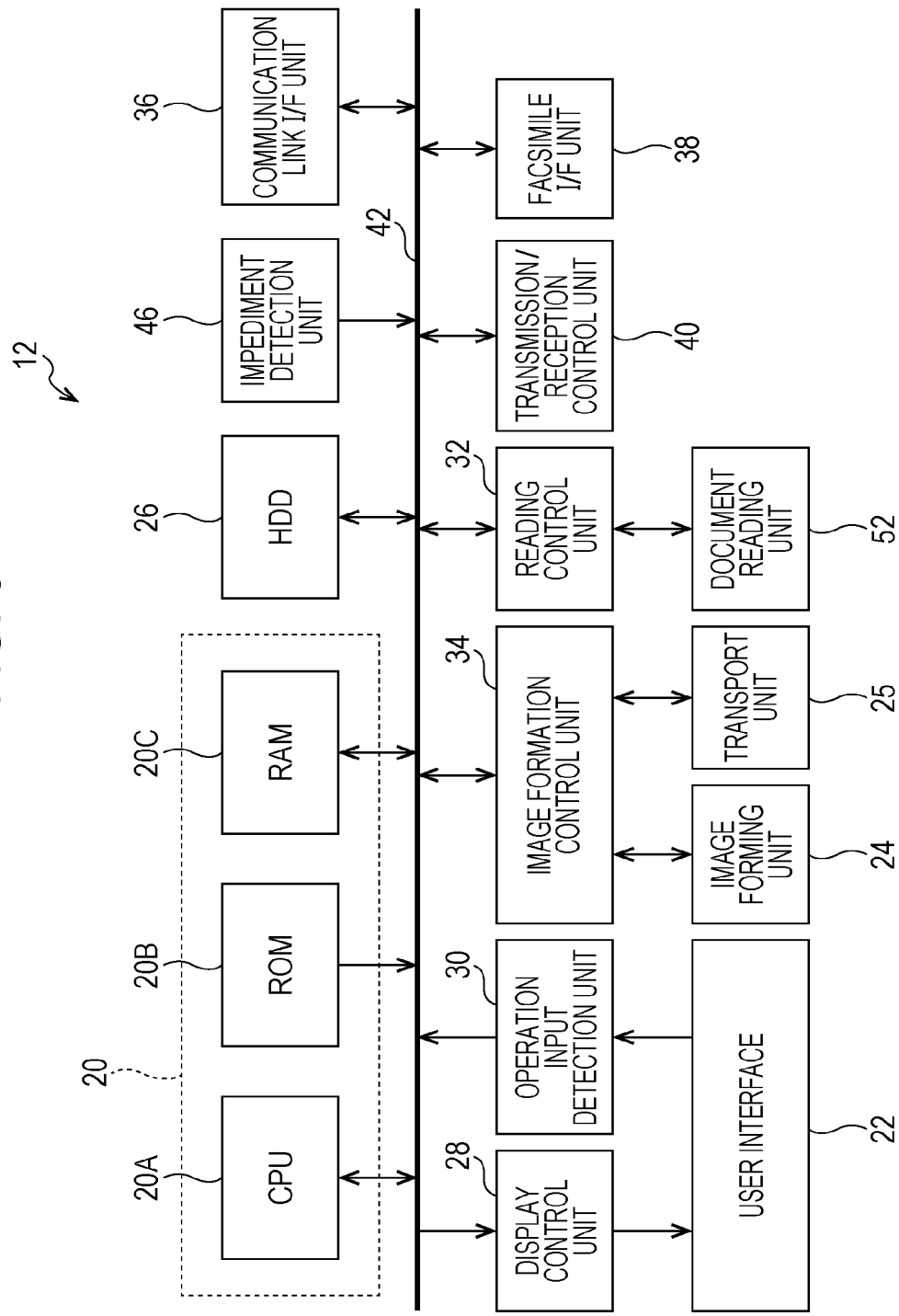
FIG. 3 is a block diagram illustrating a substantial configuration of an electrical system of the image forming device according to the exemplary embodiment.

FIG. 3 is a block diagram illustrating a substantial configuration of an electrical system of an image forming device 12 according to the exemplary embodiment.

As illustrated in FIG. 3, the image forming device 12 according to the exemplary embodiment is provided with a control unit 20 including a central processing unit (CPU) 20A, read-only memory (ROM) 20B, and random-access memory (RAM) 20C. The CPU 20A directs the operation of the image forming apparatus 12 overall. The RAM 20C is used as a work area or the like when the CPU 20A executes various programs. The ROM 20B stores information such as various control programs and various parameters in advance. Additionally, in the image forming device 12, each component of the control unit 20 is electrically connected by a system bus 42.

On the other hand, the image forming device 12 according to the exemplary embodiment is provided with a hard disk drive (HDD) 26 that stores various data, application programs, and the like. In addition, the image forming device 12 is provided with a display control unit 28 that is connected to the user interface 22 and that controls the display of various operation screens and the like on the display 22A of the user interface 22. Also, the image forming device 12 is provided with an operation input detection unit 30 that is connected to the user interface 22 and that detects an operation instruction input through the user interface 22. Additionally, in the image forming device 12, the HDD 26, the display control unit 28, and the operation input detection unit 30 are electrically connected to the system bus 42. Note that in the image forming device 12 according to the exemplary embodiment, the HDD 26 is applied as the storage unit, but the storage unit is not limited thereto, and a non-volatile storage unit such as flash memory may also be applied.

In addition, the image forming device 12 according to the exemplary embodiment is provided with a reading control unit 32 that controls an optical image reading operation by the document reading unit 52 and a document conveying operation by the document transport unit, and an image formation control unit 34 that controls the image forming process by the image forming unit 24 and the transporting of a paper sheet to the image forming unit 24 by the transport unit 25. In addition, the image forming device 12 is provided with a communication link interface (I/F) unit 36 that is connected to the communication link 18 and that transmits and receives communication data with other external devices such as the server 16 connected to the communication link 18, and an impediment detection unit 46 that detects the occurrence of an impediment in the image forming device 12. Also, the image forming device 12 is provided with a facsimile interface (I/F) unit 38 that is connected to a telephone line not illustrated and that transmits and receives facsimile data with a facsimile machine connected to the telephone line. Additionally, the 12 is provided with a transmission/reception control unit 40 that controls the transmission and reception of facsimile data through the facsimile I/F unit 38. Additionally, in the image forming device 12, the transmission/reception control unit 40, the reading control unit 32, the image formation control unit 34, the communication link I/F unit 36, the facsimile I/F unit 38, and the impediment detection unit 46 are electrically connected to the system bus 42.

By the above configuration, in the image forming device 12 according to the exemplary embodiment, access to each of the RAM 20C, the ROM 20B, and the HDD 26 is executed by the CPU 20A. Also, by the CPU 20A, the image forming device 12 controls the display of information such as operation screens and various messages on the display 22A of the user interface 22 through the display control unit 28. Also, by the CPU 20A, the image forming device 12 controls the operations of the document reading unit 52 and the document transport unit through the reading control unit 32. Also, by the CPU 20A, the image forming device 12 controls the operations of the image forming unit 24 and the transport unit 25 through the image formation control unit 34, and controls the transmission and reception of communication data through the communication link I/F unit 36. Also, by the CPU 20A, the image forming device 12 controls the transmission and reception of facsimile data through the facsimile I/F unit 38 by the transmission/reception control unit 40. Furthermore, by the CPU 20A, the image forming device 12 grasps the content of operations on the user interface 22 based on operation information detected by the operation input detection unit 30, and executes various controls based on the content of the operations.

In addition, the impediment detection unit 46 detects impediments occurring in the document reading unit 52, the image forming unit 24, the transport unit 25, and the like. Examples of impediments to detect include malfunctions in the document reading unit 52 or the motor of the transport unit 25, insufficient paper stored in the paper feed storage unit 58, paper jams in the transport unit 25, and the like.

Figure 4:
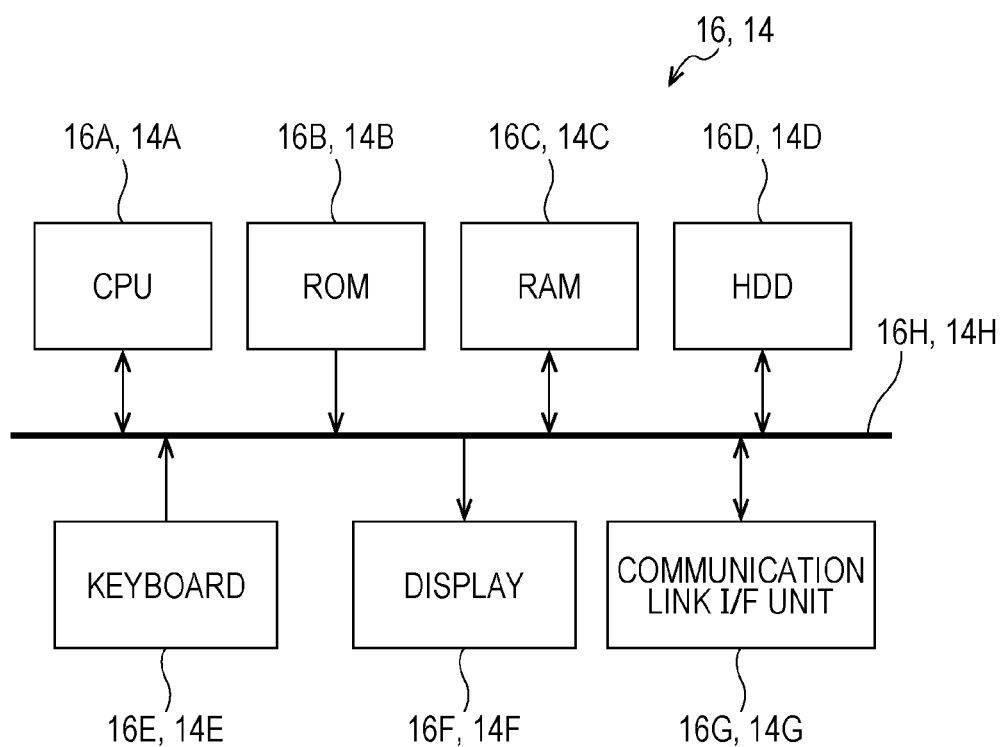
FIG. 4 is a block diagram illustrating a substantial configuration of an electrical system of information processing device and a server according to the exemplary embodiment.

Next, a substantial configuration of the electrical system of an information processing device 14 and the server 16 according to the exemplary embodiment will be described. FIG. 4 is a block diagram illustrating a substantial configuration of the electrical system of an information processing device 14 and the server 16 according to the exemplary embodiment. Note that since the information processing devices 14 and the server 16 basically take the configuration of a typical computer, herein, the server 16 will be described as a representative example.

As illustrated in FIG. 4, the server 16 according to the exemplary embodiment is provided with a CPU 16A, ROM 16B, RAM 16C, an HDD 16D, a keyboard 16E, a display 16F, and a communication link interface (I/F) unit 16G. The CPU 16A directs the operation of the server 16 overall. The ROM 16B stores information such as various control programs and various parameters in advance. The RAM 16C is used as a work area or the like when the CPU 16A executes various programs. The HDD 16D stores various data, application programs, and the like. The keyboard 16E is used to input various information. The display 16f is used to display various information. The communication link I/F unit 16G is connected to the communication link 18, and transmits and receives various data with another device connected to the communication link 18. Each of the above parts of the server 16 are electrically interconnected by a system bus 16H. Note that in the server 16 according to the exemplary embodiment, the HDD 26 is applied as the storage unit, but the storage unit is not limited thereto, and another non-volatile storage unit such as flash memory may also be applied.

By the above configuration, by the CPU 16A, the server 16 according to the exemplary embodiment accesses the ROM 16B, the RAM 16C, and the HDD 16D, acquires various data through the keyboard 16E, and displays various information on the display 16F. Also, by the CPU 16A, the server 16 controls the transmission and reception of communication data through the communication link I/F unit 16G.

In the information processing system 10 according to the exemplary embodiment, for example, when using one of the image forming devices 12, a user is authenticated as a registered user on the basis of identification information of the user, and the use is allowed if the user is authenticated. For example, in the case of using a function of an image forming device 12, the image forming device 12 executes authentication by reading the identification information of the user from a card with a card reader or acquiring a password input by an operation on the user interface 22, and use of the function is allowed if the user is authenticated. Also, in the case of requesting image formation from one of the information processing devices 14, authentication is executed by acquiring identification information that identifies the information processing device 14 together with the image formation request, and the use is allowed if authentication is successful. Note that although the authentication function is described as being provided in the image forming device 12 as an example, but the authentication function may also be provided in the server 16. For example, in the case in which the authentication function is provided in the server 16, it is sufficient to preregister identification information of the user or identification information that identifies the information processing device 14 of the user in the server 16, and when a function is used, execute authentication by verifying against the registered identification information.

Also, in the image forming devices 12 of the information processing system 10 according to the exemplary embodiment, a storage area that stores user identification information for executing authentication and a storage area that stores related information that relates to processes that the user executes on an image forming device 12 locally are provided in the HDD 26. Note that in the following, the storage area that stores identification information will be designated the user database (DB). Also, the storage area that stores related information will be designated the user-related database (DB).

Meanwhile, if a registered user is deleted from the user DB, the related information that relates to the deleted user still remains in the user-related DB, and security is no longer guaranteed. Also, in the case in which the authentication mode is changed and the user is excluded from authentication by the changed authentication mode, the related information that relates to the user deleted from the user DB still remains in the user-related DB, and security is no longer guaranteed in this case as well.

Accordingly, in the present embodiment, in the case in which a registered user is deleted due to a change of authentication mode or the like, a function that deletes the related information that relates to the deleted user from the user-related DB is provided. With this arrangement, in the case in which a registered user is deleted, the related information that relates to the deleted user is also deleted, and security is guaranteed.

Figure 5:
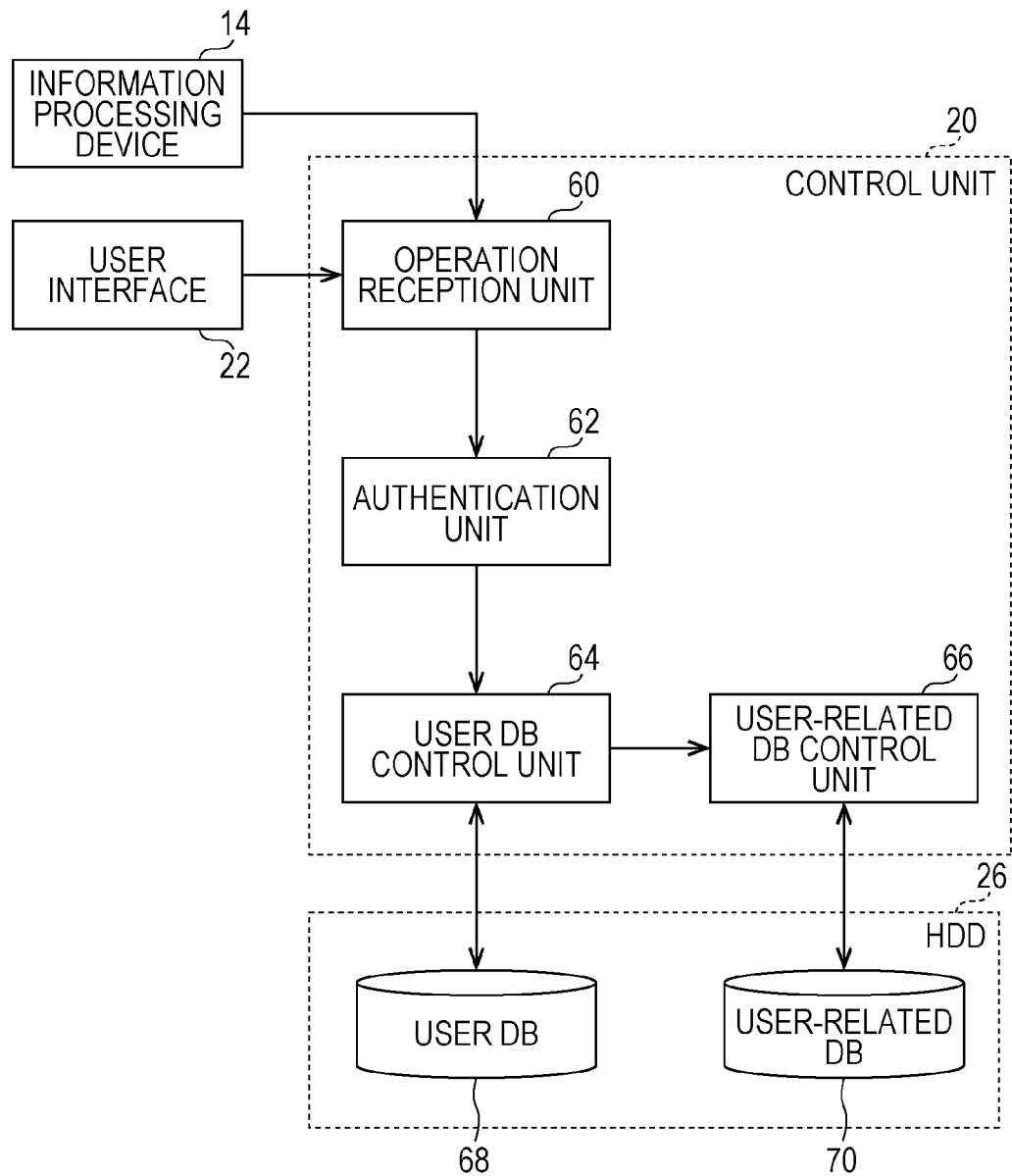
FIG. 5 is a function block diagram illustrating functions executed by the information processing device of the information processing system according to the exemplary embodiment.

Next, specific functions executed by an image forming device 12 of the information processing system 10 according to the exemplary embodiment will be described. FIG. 5 is a function block diagram illustrating functions executed by an information processing device 12 of the information processing system 10 according to the exemplary embodiment.

The control unit 20 of the image forming device 12 is provided with the functions of an operation reception unit 60 that acts as a reception unit, an authentication unit 62, a user DB control unit 64, and a user-related DB control unit 66 that acts as a deletion unit and a deletion control unit.

The operation reception unit 60 receives operations from at least one of the user interface 22 and the information processing devices 14. For example, in the exemplary embodiment, in the case in which the user interface 22 or an information processing device 14 is operated and authentication information for authentication (such as a password, for example) is input, the authentication information for authentication is received as an operation. In addition, in the case in which an instruction to delete a registered user is given, a registered user deletion instruction is received. Also, in the case in which an operation of changing the authentication mode is performed, an authentication mode change instruction is received. Also, in the case in which an operation of changing the counting mode is performed, a counting mode change instruction is received.

In the case in which the operation reception unit 60 receives authentication information as a received operation, the authentication unit 62 authenticates the user by verifying the authentication information. User authentication is executed by verifying whether or not the received authentication information matches a preregistered user.

The user DB control unit 64 controls access to a user DB 68 that acts as an identification storage unit storing user identification information or the like (such as identification information (ID), for example). For example, when registering a user to be authenticated, the storage of information such as identification information of the target user in the user DB 68 is controlled. On the other hand, in the case of deleting a registered user, the deletion of the identification information of the user to be deleted that is stored in the user DB 68 is controlled.

The user-related DB control unit 66 controls access to a user-related DB 70 that acts as a storage unit storing related information that relates to users. For example, in the case in which a registered user issues an image formation request, the image information acting as the target of image formation is stored as related information that relates to the user. Also, in the exemplary embodiment, in the case in which a registered user is deleted or in the case in which the authentication mode is changed, the user-related DB control unit 66 controls the deletion of the related information that relates to the target user stored in the user-related DB 70.

Note that in the exemplary embodiment, a configuration in which the functions illustrated in FIG. 5 are provided in the control unit 20 of the image forming device 12 is described as an example, but the configuration is not limited thereto. For example, functions related to authentication may also be provided in the external server 16. Alternatively, all of the functions of the control unit 20 illustrated in FIG. 5 may be provided in the external server 16. Also, a configuration in which the user DB 68 and the user-related DB 70 in the HDD 26 are provided in the server 16 may be configured.

Figure 6:
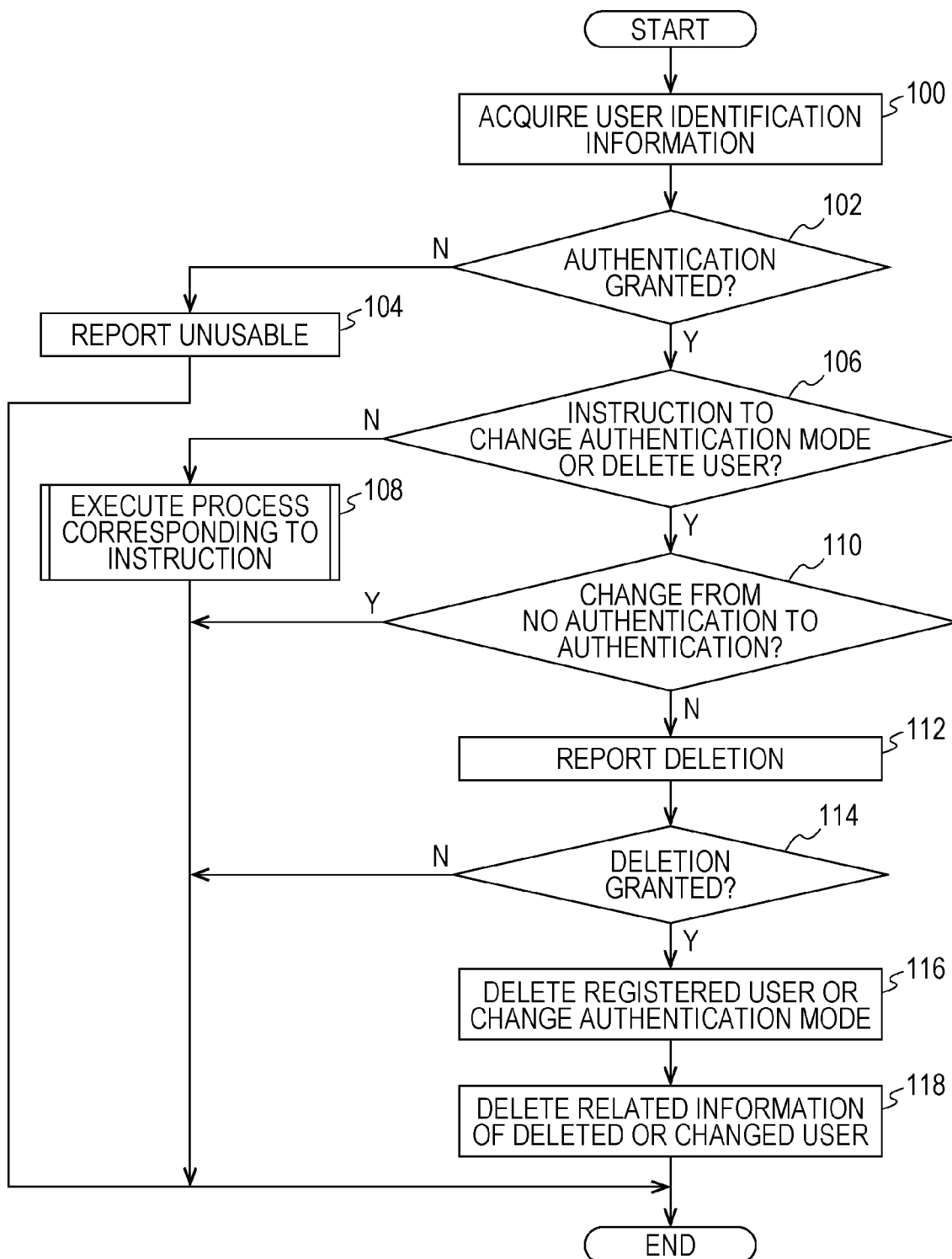
FIG. 6 is a flowchart illustrating one example of the flow of processes executed by the image forming device of the information processing device according to the exemplary embodiment.

Next, specific processes executed by an image forming device 12 of the information processing system 10 according to the exemplary embodiment configured as above will be described. FIG. 6 is a flowchart illustrating one example of the flow of processes executed by an image forming device 12 of the information processing system 10 according to the exemplary embodiment. Note that the processes in FIG. 6 are described as being started in the case in which an operation for authentication is performed with respect to an image forming device 12 from the user interface 22 or an information processing device 14.

In step 100, the operation reception unit 60 receives the operation for authentication from the user interface 22 or the information processing device 14, acquires identification information such as the password of the user, and proceeds to step 102.

In step 102, the authentication unit 62 determines whether or not authentication is granted. This determination determines whether or not a user corresponding to the acquired identification information exists in the user DB 68. If the determination is negative, the flow proceeds to step 104, whereas if positive, the flow proceeds to step 106.

In step 104, the authentication unit 62 reports that use is unavailable, and the series of processes ends. For example, in the case in which the operation reception unit 60 receives an operation from the user interface 22, a notification that use is unavailable is displayed on the display 22A of the user interface 22. Also, in the case in which the operation reception unit 60 receives an operation from an information processing device 14, information indicating that use is unavailable is transmitted to the information processing device 14 and displayed on a display 14F of the information processing device 14.

In step 106, the user DB control unit 64 determines whether or not the operation received by the operation reception unit 60 is an instruction to change the authentication mode or to delete a registered user. If the determination is negative, the flow proceeds to step 108, whereas if positive, the flow proceeds to step 110. Note that step 106 may also be treated as a process that determines only whether or not an instruction to change the authentication mode has been given. Alternatively, step 106 may be treated as a process that determines only whether or not an instruction to delete a registered user has been given.

In step 108, the control unit 20 performs a series of processes by performing a process of executing the process corresponding to the instruction of the operation received by the operation reception unit 60. For example, in the case in which the operation reception unit 60 receives an image formation request from the information processing device 14 as the operation, the image formation control unit 34 controls the formation of an image onto a paper sheet on the basis of image information transmitted together with the image formation request.

On the other hand, in step 110, the operation reception unit 60 determines whether or not an operation of changing from no authentication to authentication has been received as the change of the authentication mode. If the determination is negative, the flow proceeds to step 112, whereas if positive, the flow ends immediately. In other words, in the case of switching from no authentication to authentication, since the process ends without deleting the related information that relates to the user by subsequent processes, even if the authentication mode is changed, in the case of changing from no authentication to authentication, the deletion of the related information that relates to the user is prohibited.

Figure 7:
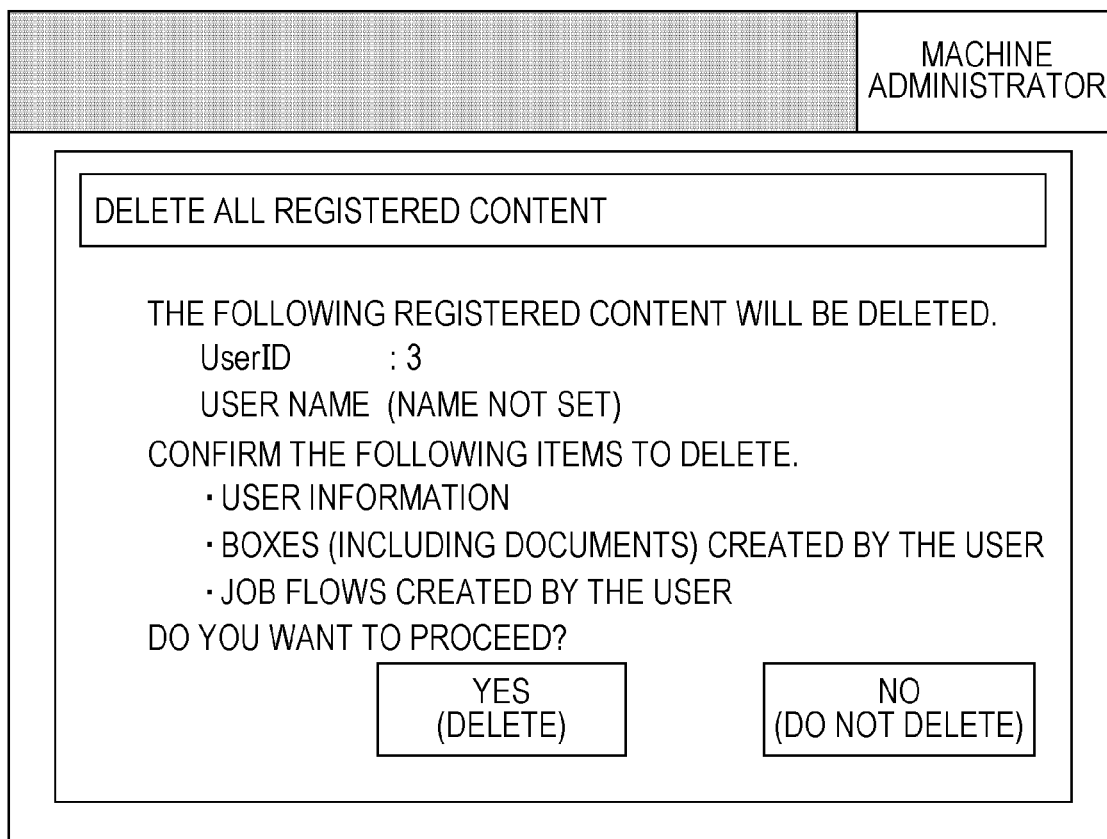
FIG. 7 is a diagram illustrating one example of a notification screen for querying whether or not to delete a registered user and also whether or not to delete related information that relates to the user to be deleted.

In step 112, the user DB control unit 64 reports that the user to be deleted or the related information that relates to the user for whom the authentication mode has been changed will be deleted, and the flow proceeds to step 114. For example, in the case of deleting a registered user, a notification screen for querying whether or not to delete a registered user and also whether or not to delete related information that relates to the user to be deleted is displayed as illustrated in FIG. 7. Note that the notification screen is displayed on the display 22A of the user interface 22 in the case in which the operation reception unit 60 receives the operation from the user interface 22. On the other hand, the notification screen is displayed on the display 14F of the information processing device 14 in the case of receiving the operation from the information processing device 14.

In step 114, the operation reception unit 60 determines whether or not a grant allowing the deletion has been received. If the determination is positive, the flow proceeds to step 116, whereas if negative, the flow ends immediately.

In step 116, the user DB control unit 64 deletes the registered user targeted for deletion or changes the authentication mode according to the received operation, and proceeds to step 118. In other words, in the case of deleting the user, the user DB control unit 64 deletes the identification information of the user to be deleted from the user DB 68. Also, in the case of changing the authentication mode, the user DB control unit 64 changes the authentication mode of the identification information of the target user stored in the user DB 68.

In step 118, the user-related DB control unit 66 deletes the related information that relates to the user who has been deleted or for whom the authentication mode has been changed, and the series of processes ends. With this arrangement, security is guaranteed in the case in which a registered user is deleted or in the case in which the method of identifying a user is changed, such as the case in which the authentication mode is changed.

Figure 8:
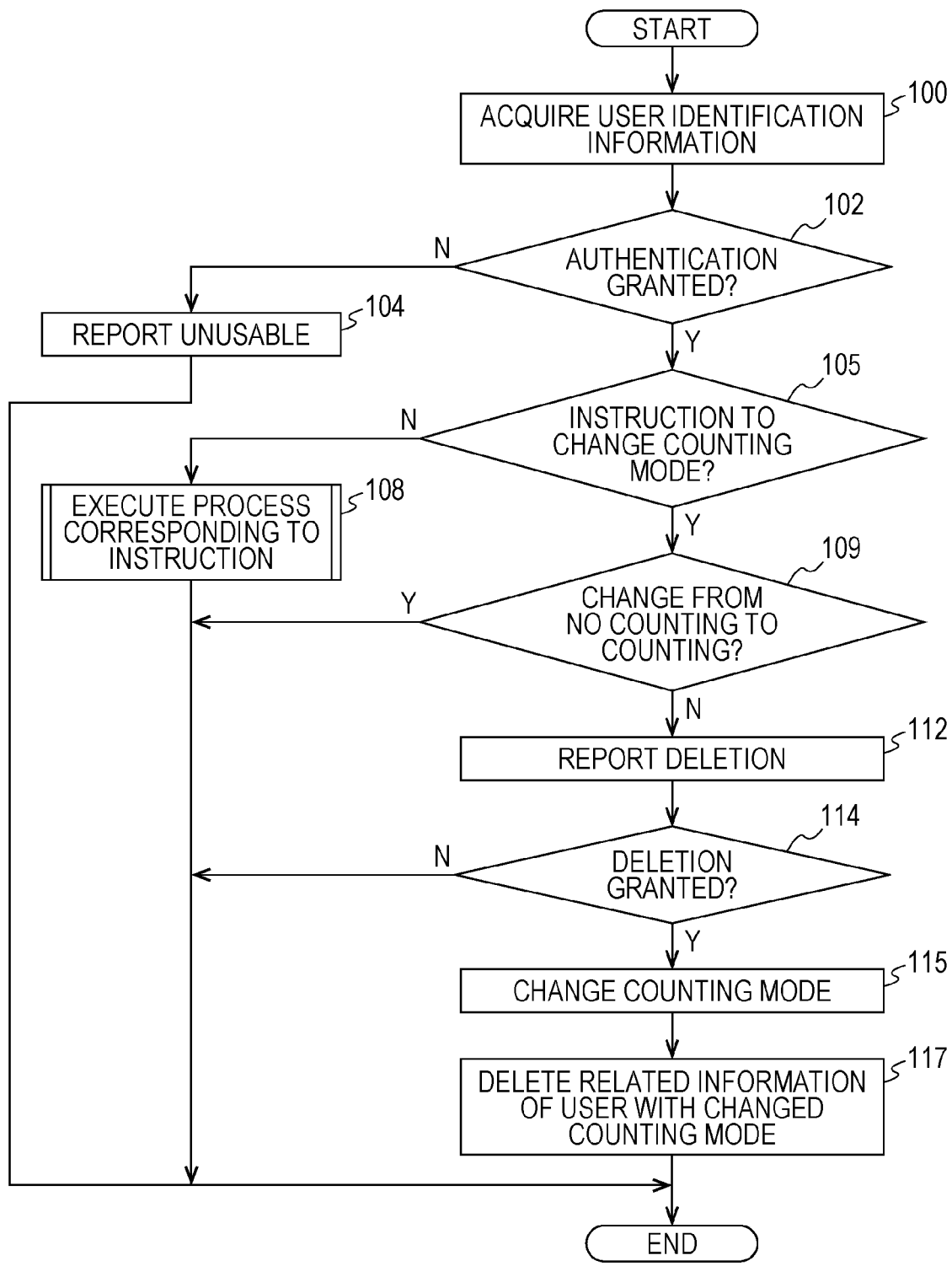
FIG. 8 is a flowchart illustrating an exemplary modification of the flow of processes executed by the image forming device of the information processing device according to the exemplary embodiment.

The above process of FIG. 6 describes an example in which, in the case in which a registered user is deleted or the authentication mode is changed, the related information that relates to the user stored in the user-related DB 70 is deleted, but the related information that relates to the user may also be deleted in the case in which the counting mode is changed. For example, in the case in which the counting mode is changed from counting per account to counting per group, similarly to the case in which the authentication mode is changed, since related information that relates to the user is left over, the related information that relates to the user may be deleted. FIG. 8 is a flowchart illustrating a modification of the flow of processes executed by an image forming device 12 of the information processing system 10 according to the exemplary embodiment. Note that the processes in FIG. 8 are described as being started in the case in which an operation for authentication is performed with respect to an image forming device 12 from the user interface 22 or an information processing device 14. Also, processes which are the same as the processes in FIG. 6 are denoted with the same signs.

In step 100, the operation reception unit 60 receives the operation for authentication from the user interface 22 or the information processing device 14, acquires identification information such as the password of the user, and proceeds to step 102.

In step 102, the authentication unit 62 determines whether or not authentication is granted. This determination determines whether or not a user corresponding to the acquired identification information exists in the user DB 68. If the determination is negative, the flow proceeds to step 104, whereas if positive, the flow proceeds to step 105.

In step 104, the authentication unit 62 reports that use is unavailable, and the series of processes ends. For example, in the case in which the operation reception unit 60 receives an operation from the user interface 22, a notification that use is unavailable is displayed on the display 22A of the user interface 22. Also, in the case in which the operation reception unit 60 receives an operation from an information processing device 14, information indicating that use is unavailable is transmitted to the information processing device 14 and displayed on a display 14F of the information processing device 14.

In step 105, the user DB control unit 64 determines whether or not the operation received by the operation reception unit 60 is an instruction to change the counting mode. If the determination is negative, the flow proceeds to step 108, whereas if positive, the flow proceeds to step 109.

In step 108, the control unit 20 performs a series of processes by performing a process of executing the process corresponding to the instruction of the operation received by the operation reception unit 60. For example, in the case in which the operation reception unit 60 receives an image formation request from the information processing device 14 as the operation, the image formation control unit 34 controls the formation of an image onto a paper sheet on the basis of image information transmitted together with the image formation request.

On the other hand, in step 109, the operation reception unit 60 determines whether or not an operation of changing from no counting to counting has been received as the change of the counting mode. If the determination is negative, the flow proceeds to step 112, whereas if positive, the flow ends immediately. In other words, in the case of switching from no counting to counting, since the process ends without deleting the related information that relates to the user by subsequent processes, even if the counting mode is changed, in the case of changing from no counting to counting, the deletion of the related information that relates to the user is prohibited.

In step 112, the user DB control unit 64 reports that the related information that relates to the user for whom the counting mode has been changed will be deleted, and the flow proceeds to step 114. For example, a notification screen for querying whether or not to delete the related information that relates to the user for whom to change the counting mode is displayed. Note that the notification screen is displayed on the display 22A of the user interface 22 in the case in which the operation reception unit 60 receives the operation from the user interface 22. On the other hand, the notification screen is displayed on the display 14F of the information processing device 14 in the case of receiving the operation from the information processing device 14.

In step 114, the operation reception unit 60 determines whether or not a grant allowing the deletion has been received. If the determination is positive, the flow proceeds to step 115, whereas if negative, the flow ends immediately.

In step 115, the user DB control unit 64 changes the counting mode of the registered user targeted for the change of counting mode according to the received operation, and proceeds to step 117. In other words, the user DB control unit 64 changes the counting mode of the identification information of the target user stored in the user DB 68.

In step 117, the user-related DB control unit 66 deletes the related information that relates to the user for whom the counting mode has been changed, and the series of processes ends. With this arrangement, similarly to the case in which the authentication mode of a registered user is changed, security is guaranteed in the case in which the counting mode of a registered user is changed and the method of identifying the user is changed.

Note that the conditions on deleting the related information that relates to the user are not limited to the above. For example, suppose that the authentication mode includes the three types of no authentication, main unit authentication, and external unit authentication, and the counting mode includes the three types of no counting, main unit counting, and external unit counting. Additionally, when there is a change from hatching to no hatching or a change from no hatching to hatching in FIG. 9, the related information that relates to the user may be deleted. The authentication mode and the counting mode are not limited to three types each, and may also include two types, or four types or more.

Figure 10:
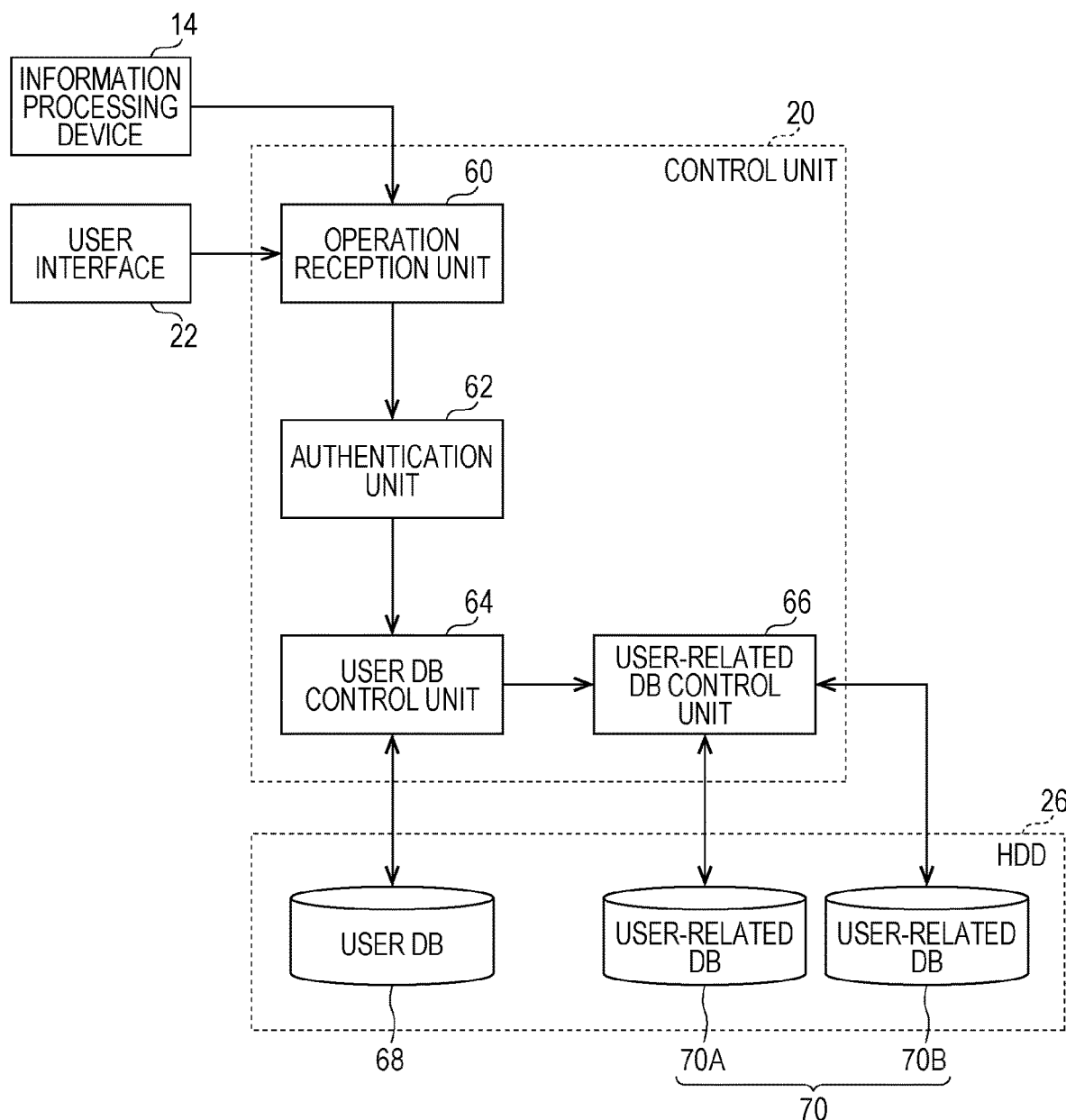
FIG. 10 is a block diagram illustrating an example in which a user-related DB is provided for each authentication mode including the authentication mode and the counting mode.

Also, the exemplary embodiment above describes an example in which a single user-related DB 70 is provided, but is not limited thereto. For example, multiple user-related DBs 70 may be provided for each authentication method, which includes the authentication mode and the counting mode. Specifically, as illustrated in FIG. 10, two user-related DBs 70A and 70B may be provided and each may be accessible by a different authentication method. In this case, the user-related DB control unit 66 stores related information that relates to the user for each authentication method in the user-related DBs 70. Additionally, it is sufficient to delete the related information stored in the user-related DB 70 for each authentication method according to a change of the method of identifying a user, such as the deletion of the user, a change of the authentication mode, and a change of the counting mode. For example, in the case in which the authentication mode or the counting mode in the authentication method is changed, the user-related DB control unit 66 may control whether or not to delete the related information that relates to the user stored in the user-related DB 70s. At this point, whether to delete or not is determined in accordance with the content of an operation performed on a notification screen like the one illustrated in FIG. 7 and received by the operation reception unit 60, for example.

Also, the processes conducted by the image forming devices 12 according to the foregoing exemplary embodiment may be taken to be processes performed by software, process performed by hardware, or processes performed by a combination of the two. Also, each of these processes may be distributed by being stored on a storage medium such as a program.

In addition, the present disclosure is not limited to the foregoing, and obviously various modifications other than the above may be carried out within a scope that does not depart from the gist of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a memory; and
a processor, coupled to the memory and configured to:
receive an instruction to delete a preregistered user; and
delete related information corresponding to a user targeted for deletion received in a case in which an authentication mode of authenticating a user is changed,
wherein the related information is stored in an image forming device and relates to a process that the user executes on the information processing device itself.

2. The information processing device according to claim 1, wherein
the processor further configured to delete the related information in a case of changing from a mode of authenticating a user to a mode of not authenticating a user.

3. The information processing device according to claim 1, wherein
the processor further configured to prohibit the deletion of the related information in a case of changing from a mode of not authenticating a user to a mode of authenticating a user.

4. The information processing device according to claim 1, wherein
the processor further configured to delete the related information in a case in which a counting mode of executing a counting related to use by a user is changed.

5. The information processing device according to claim 4, wherein
the processor further configured to prohibit the deletion of the related information in a case of changing from a mode of not counting to a predetermined counting mode.

6. The information processing device according to claim 1, wherein
the image forming device provides in correspondence with each authentication method of authenticating a user in the information processing device itself.

7. The information processing device according to claim 6, wherein
the processor further configured to control whether or not deleting the related information stored by the storage unit in a case in which an authentication mode or a counting mode in the authentication method is changed.

8. The information processing device according to claim 1, wherein
identification information of a preregistered user is stored in the image forming device, and
the processor further configured to additionally delete the identification information of a deletion target about received an instruction.

9. An information processing device comprising:
a memory, and
a processor coupled to the and configured to:
delete related information stored in the storage unit in a case in which an authentication mode of authenticating the user is changed or in a case in which a counting mode of executing a counting related to use by the user is changed,
wherein the related information that relates to a process that a preregistered user executes on the information processing device itself is stored in an image forming device.

10. A non-transitory computer readable medium storing a program causing a computer to execute a process for processing information, the process comprising:
receiving an instruction to delete a preregistered user;
storing related information that relates to a process that the user executes on the computer itself; and
deleting the stored related information corresponding to a user targeted for deletion according to the received instruction in a case in which an authentication mode of authenticating a user is changed.

* * * * *